United States Patent
Kubo

(10) Patent No.: US 8,898,023 B2
(45) Date of Patent: Nov. 25, 2014

(54) BIOLOGICAL INFORMATION MANAGEMENT SYSTEM AND BIOLOGICAL INFORMATION MANAGEMENT METHOD

(75) Inventor: Nobuo Kubo, Kyoto (JP)

(73) Assignee: Omron Healthcare Co., Ltd., Kyoto (JP)

( * ) Notice: Subject to any disclaimer, the term of this patent is extended or adjusted under 35 U.S.C. 154(b) by 709 days.

(21) Appl. No.: 13/196,336

(22) Filed: Aug. 2, 2011

(65) Prior Publication Data

US 2012/0016596 A1 Jan. 19, 2012

Related U.S. Application Data

(63) Continuation of application No. PCT/JP2010/052942, filed on Feb. 25, 2010.

(30) Foreign Application Priority Data

Feb. 26, 2009 (JP) ................................. 2009-044188

(51) Int. Cl.
*H04L 9/32* (2006.01)
*G06F 21/32* (2013.01)

(52) U.S. Cl.
CPC .............. *G06F 21/32* (2013.01); *H04L 9/3231* (2013.01)
USPC .......................................................... 702/19

(58) Field of Classification Search
CPC .................................................... H04L 9/3231
USPC .......................................................... 702/19
See application file for complete search history.

(56) References Cited

U.S. PATENT DOCUMENTS

2008/0172725 A1* 7/2008 Fujii et al. .......................... 726/5

FOREIGN PATENT DOCUMENTS

| JP | A-9-139735 | 5/1997 |
|---|---|---|
| JP | A-2002-140306 | 5/2002 |
| JP | A-2006-119936 | 5/2006 |
| JP | A-2008-72205 | 3/2008 |
| JP | A-2008-198035 | 8/2008 |
| WO | WO 2006/043585 A1 | 4/2006 |

OTHER PUBLICATIONS

International Search Report issued in International Application No. PCT/JP2010/052942 on Mar. 23, 2010 (with translation).

* cited by examiner

*Primary Examiner* — Bryan Bui
(74) *Attorney, Agent, or Firm* — Oliff PLC

(57) ABSTRACT

A measurement result management system suited for storing biological information measured with a measuring equipment in a server is provided. The measurement result management system includes a measuring equipment for measuring and transmitting biological information, and a server for receiving the biological information from the measuring equipment and storing the same, wherein the measuring equipment performs a step of transmitting authentication related information related to authentication of the measuring equipment when transmitting the biological information with a communication unit, and the server performs a step of carrying out authentication based on the authentication related information, and steps of storing the biological information acquired through a communication unit in a storage unit regardless of whether the authentication result of the step of carrying out authentication based on authentication related information is positive or negative.

5 Claims, 12 Drawing Sheets

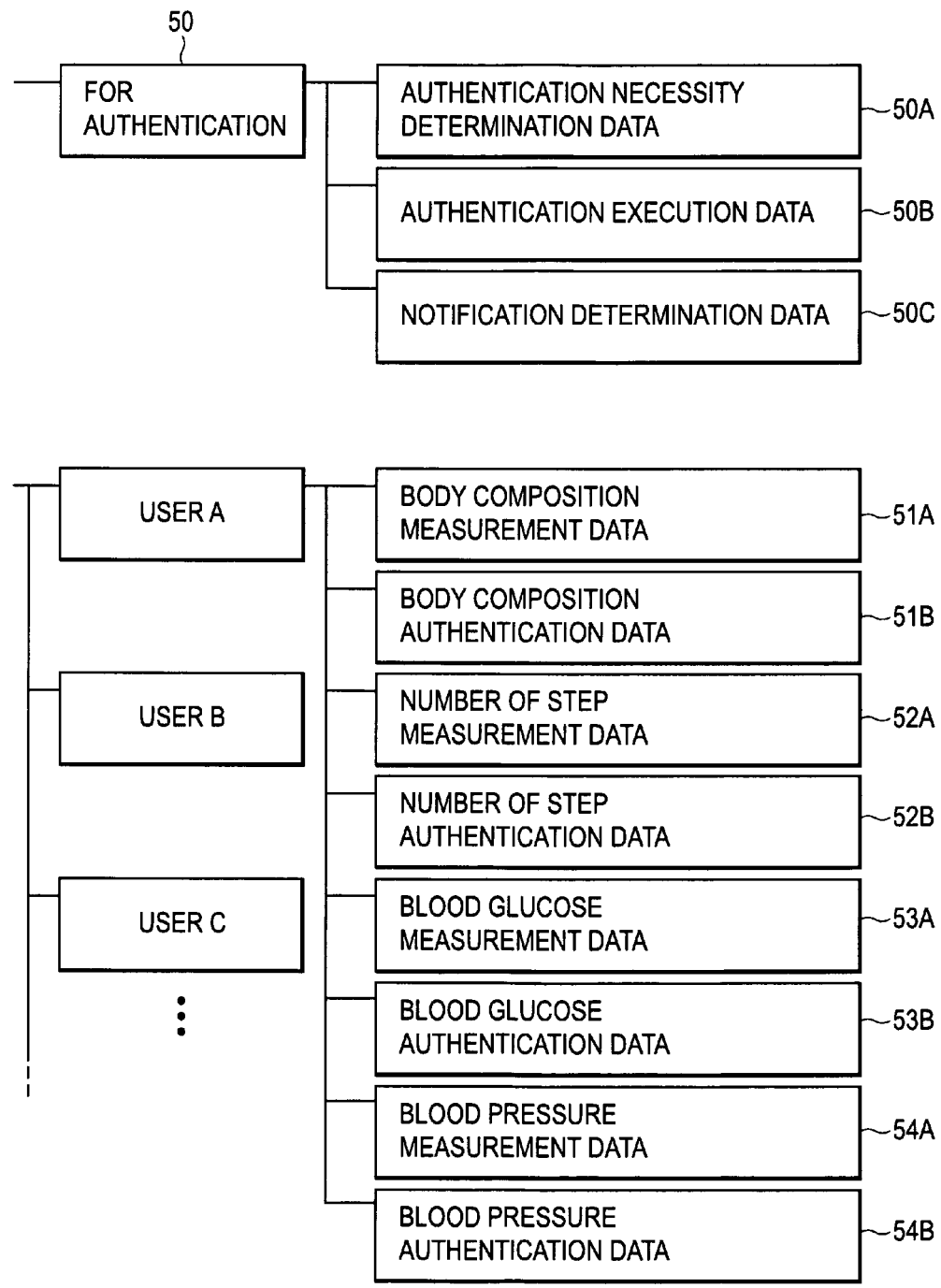

FIG. 3B

BODY COMPOSITION MEASUREMENT DATA　51A

| ID | MEASUREMENT DATE AND TIME | FAT FREE PERCENTAGE | FAT FREE MASS | WEIGHT |
|----|---------------------------|---------------------|---------------|--------|
| 1  | 2/3 10:04                 | 0%                  | 0kg           | 0kg    |
| 2  | 2/3 19:58                 | 0%                  | 0kg           | 0kg    |
| 3  | 2/4 09:27                 | 0%                  | 0kg           | 0kg    |
| 4  | 2/4 18:21                 | 0%                  | 0kg           | 0kg    |
| ⋮  |                           |                     |               |        |

FIG. 3C

BODY COMPOSITION AUTHENTICATION DATA　51B

| ID | MEASUREMENT DATE AND TIME | AUTHENTICATION RESULT | COMMUNICATION RANGE |
|----|---------------------------|------------------------|---------------------|
| 1  | 2/3 20:02                 | DUMMY                  | 1-2                 |
| 2  | 2/4 09:58                 | SUCCESS                | 3                   |
| 3  | 2/6 18:21                 | DUMMY                  | 4-7                 |
| 4  | 2/7 12:09                 | FAIL                   | 8-9                 |
| ⋮  |                           |                        |                     |

FIG. 3D

NUMBER OF STEP MEASUREMENT DATA 52A

| ID | MEASUREMENT DATE | 00-01 | 01-02 | ... | 23-00 |
|---|---|---|---|---|---|
| 1 | 2/3 | 158 | 0 | ... | 0 |
| 2 | 2/4 | 0 | 0 | ... | 887 |
| 3 | 2/5 | 403 | 23 | ... | 144 |

NUMBER OF STEP AUTHENTICATION DATA 52B

| ID | COMMUNICATION DATE AND TIME | AUTHENTICATION RESULT | COMMUNICATION RANGE |
|---|---|---|---|
| 1 | 2/3 20:06 | DUMMY | 1 |
| 2 | 2/4 09:43 | SUCCESS | 2 |
| 3 | 2/6 18:03 | DUMMY | 3-4 |
| 4 | 2/7 12:17 | FAIL | 5 |

(a) Measuring equipment registration information management table 21

| Login ID | Measurement type | Authentication value |
|---|---|---|
| ooo | oo | ooo |
| ooo | oo | ooo |
| ooo | oo | ooo |
| ooo | oo | ooo |
| ooo | oo | ooo |
| ⋮ | ⋮ | ⋮ |

(b) Authentication value management table 101

| Login ID | Authentication value |
|---|---|
| ooo | ooo |

(c) Measurement result management table 22

| Measurement number | Login ID | Measurement date and time | Measurement value |
|---|---|---|---|
| ooo | ooo | ooo | ooo |
| ooo | ooo | ooo | ooo |
| ooo | ooo | ooo | ooo |
| ooo | ooo | ooo | ooo |
| ooo | ooo | ooo | ooo |
| ⋮ | ⋮ | ⋮ | ⋮ |

(d) Measurement result management table 23

| Authentication number | Login ID | Authentication date and time | Authentication result |
|---|---|---|---|
| ooo | ooo | oo.oo.oo | 1 |
| ooo | ooo | oo.oo.oo | 0 |
| ooo | ooo | oo.oo.oo | 1 |
| ooo | ooo | oo.oo.oo | 1 |
| ooo | ooo | oo.oo.oo | 0 |
| ⋮ | ⋮ | ⋮ | ⋮ |

Fig. 8

(a) Measuring equipment registration information management table 21

| Login ID | Type of measurement | Date authentication value | Related date |
|---|---|---|---|
| ○○○ | ○○ | △△△○○○ | ○○. ○○. ○○ |
| ○○○ | ○○ | △△△○○○ | ○○. ○○. ○○ |
| ○○○ | ○○ | △△△○○○ | ○○. ○○. ○○ |
| ○○○ | ○○ | △△△○○○ | ○○. ○○. ○○ |
| ○○○ | ○○ | △△△○○○ | ○○. ○○. ○○ |
| ⋮ | ⋮ | ⋮ | ⋮ |

(b) Authentication value management table 101

| Date authentication value | Related date |
|---|---|
| ○○○○ | ○○. ○○. ○○ |
| ○○○○ | ○○. ○○. ○○ |
| ○○○○ | ○○. ○○. ○○ |
| ○○○○ | ○○. ○○. ○○ |
| ○○○○ | ○○. ○○. ○○ |
| ⋮ | ⋮ |

BIOLOGICAL INFORMATION MANAGEMENT SYSTEM AND BIOLOGICAL INFORMATION MANAGEMENT METHOD

TECHNICAL FIELD

The present invention relates to a biological information management system and a biological information management method for acquiring and managing biological information from a measuring equipment for acquiring the biological information.

BACKGROUND ART

Various measuring equipments such as a body composition meter, a thermometer, a body motion measuring device (pedometer, activity amount meter), or sphygmomanometer are conventionally known as a user equipment for acquiring the biological information, where a management system in which the measurement result of such measuring equipment is transmitted to a server to be collectively managed is known.

In such management system, management of the measurement result by a non-legitimate measuring equipment, which is not a legitimate article, having low reliability lowers the reliability of the system. Therefore, the management system includes an authentication system for authenticating that the measuring equipment is a legitimate article to eliminate the access by the non-legitimate measuring equipment.

In such authentication system, a method of encrypting the data for communication as described in patent document 1 is used to prevent the communication data for authentication from being analyzed and the authentication by the false authentication information created based on the analysis result from being carried out.

However, even if the communication data is encrypted, the communication data can be easily intercepted if the exchange of communication for authenticating the legitimate article becomes frequent such as constantly encrypting and performing authentication for every communication for transmitting the measurement result, and hence the authentication information becomes easily analyzed.

If a complex encryption is carried out in order to make the analysis of the intercepted communication data difficult, a considerable time is required for encryption with an equipment of low processing ability, and the communication time increases.

Therefore, it is not suited to applications of accumulating the biological information measured with various measuring equipments in the server.

Patent Document 1: Japanese Unexamined Patent Publication No. 9-139735

DISCLOSURE OF THE INVENTION

Problems to be Solved by the Invention

In view of the above problems, it is an object of the present invention to provide a biological information management system and a biological information management method suited for storing the biological information measured with the biological information measuring device in the management device.

Means for Solving the Problem

The present invention relates to a biological information management system including a biological information measuring device including a biological information measurement means for measuring biological information and a communication means for transmitting the biological information, and a management device including a communication means for communicating with the biological information measuring device and a storage means for storing the biological information acquired through the communication means; wherein the biological information measuring device includes an authentication related information transmission means for transmitting authentication related information related to authentication of the biological information measuring device when transmitting the biological information with the communication means, and an authentication execution necessity determining means for determining authentication execution necessity; the management device includes an authentication means for carrying out authentication based on the authentication related information, and a biological information storage processing means for storing the biological information acquired through the communication means regardless of whether the authentication result of the authentication means is positive or negative; wherein the authentication related information transmission means is configured to transmit legitimate authentication information with the communication means if determined that authentication execution is necessary by the authentication execution necessity determining means, and transmit dummy information with the communication means if determined that authentication execution is not necessary.

The biological information measuring device includes a measuring equipment including a body composition meter, a thermometer, a body motion measuring device (pedometer or activity amount meter), a sphygmomanometer, and a cardiograph equipment, or an equipment used by the user such as a treatment device or a massager, and refers to an equipment that communicates with the server after authentication.

The communication means may be a transmission means for transmitting the authentication information using wireless communication by Bluetooth (registered trademark) or infrared light, or a transmission means for transmitting the authentication information through an electric communication line such as LAN (Local Area Network) or Internet.

The authentication information may be an authentication value or an authentication function for calculating the authentication value.

The authentication execution necessity determining means is configured to determine at an appropriate standard such as determining that authentication is necessary if a predetermined period has elapsed from the last authentication, determining that authentication is necessary if the communication is performed a predetermined number of times from the last authentication, or determining that authentication necessity at random using an appropriate calculation formula.

The dummy information may be configured with appropriate information, and is preferably configured with information that is difficult to distinguish from the authentication information such as configuring with the same number of characters as the authentication information or configuring with a similar rule.

According to the present invention, the biological information can be stored regardless of the authentication result. Therefore, the biological information can be accumulated in the management device even if the user wrongly inputs the password upon request of password input and the authentication failed, so that defect of biological information can be reduced.

Furthermore, the third person trying to illegally acquire or interpret the authentication information may wrongly recognize the dummy information as the authentication information or may not be able to determine the authentication information.

In another aspect of the present invention, the management device includes an authentication execution necessity determining means for determining authentication execution necessity at the same standard as the authentication execution necessity determining means, and the authentication means is configured to execute authentication if determined that authentication execution is necessary by the authentication execution necessity determining means, and not execute authentication if determined that authentication execution is not necessary.

Therefore, even if the dummy information is sent from the biological information measuring device, authentication with the dummy information can be prevented so that authentication can be carried out only when necessary. Accordingly, a case in which the number of authentications is reduced to complete the process at high speed can be increased.

In another aspect of the invention, the biological information storage processing means is configured to store at least one determination result information of authentication success determination or authentication fail determination by the authentication means, and authentication execution unnecessary determination by the authentication execution necessity determining means in the storage means in association with the biological information.

Therefore, the information on whether the authentication failed or not can be added for the stored biological information, and whether or not the appropriately measured and received biological information can be determined after storing the biological information without leakage.

The present invention also relates to a biological information management system including a biological information measuring device including a biological information measurement means for measuring biological information and a communication means for transmitting the biological information, and a management device including a communication means for communicating with the biological information measuring device and a storage means for storing the biological information acquired through the communication means; wherein the biological information measuring device includes an authentication related information transmission means for transmitting authentication related information related to authentication of the biological information measuring device when transmitting the biological information with the communication means; and the management device includes an authentication means for carrying out authentication based on the authentication related information, a biological information storage processing means for storing the biological information acquired through the communication means regardless of whether the authentication result of the authentication means is positive or negative; and an excluding means for excluding reception of biological information transmitted from the biological information measuring device based on excluding condition; and the excluding condition is configured to exclude the reception if both a first condition based on authentication information authenticated by the authentication means and a second condition defined at a standard different from the first condition.

The first condition is failure in authentication, non-execution of the authentication or a condition combining the same.

The second condition includes condition related to the timing of carrying out excluding such as after a predetermined period from the failure in authentication, after a predetermined number of times after the failure in authentication, continuation of communication by the dummy not executing the authentication for a predetermined period or longer, or continuation of a predetermined number of times or more of the communication by the dummy not executing the authentication, and may be preferably a condition related to the period or the number of times.

The excluding may be an access prohibiting process of prohibiting the access from the non-authenticated biological information measuring device, or a notifying process of notifying non-authentication with respect to the non-authenticated biological information measuring device.

According to such aspect, the timing of determining authentication failure and the timing of excluding the acceptance of the biological information can be differed. Therefore, the biological information sent in the meantime can be accumulated and the defect of the biological information can be reduced. In particular, it is effective when normally succeeding in authentication thereafter and continuously accumulating the biological information.

Since the process related to excluding is executed at a timing different from the time of authentication failure, at which stage in the authentication it became non-authenticated cannot be analyzed, the non-authentication information cannot be specified, and the analysis of the authentication information becomes more difficult.

Therefore, a system of higher authentication accuracy can be built without executing a complex encryption processing while imposing processing load on the biological information measuring device and the management device.

In accordance with another aspect of the present invention, the present invention relates to a biological information management method for managing biological information measured with a biological information measuring device in a management device; the biological information management method including the steps of having the biological information measuring device transmit authentication related information related to authentication of the biological information measuring device by the authentication related information transmission means when transmitting the biological information with a communication means; having the biological information measuring device determine authentication execution necessity by an authentication execution necessity determining means; having the management device receive both authentication related information related to authentication and the biological information from the biological information measuring device; having the management device carry out authentication based on the authentication related information; and storing the biological information acquired through the communication means in the storage means regardless of whether the authentication result of the authentication means is positive or negative; wherein the step of transmitting the authentication related information by the authentication related information transmission means is configured to transmit legitimate authentication information with the communication means if determined that authentication execution is necessary by the authentication execution necessity determining means, and transmit dummy information with the communication means if determined that authentication execution is not necessary.

According to the present invention, the biological information can be stored regardless of the authentication result. Therefore, the biological information can be accumulated in the management device even if the user wrongly inputs the password upon request of password input and the authentication failed, so that defect of biological information can be reduced.

Effect of the Invention

According to the present invention, there is provided a biological information management system suited for storing the biological information measured with the biological information measuring device in the management device.

BRIEF DESCRIPTION OF THE DRAWINGS

FIGS. 3A to 3E are explanatory views showing one part of data stored in the storage unit of the server shown in FIG. 1.

FIGS. 5A to 5D are explanatory views of a management table of various types of information according to a second example of the present invention.

FIGS. 8A and 8B are explanatory views of a management table of various types of information according to a third example of the present invention.

BEST MODE FOR CARRYING OUT THE INVENTION

The best modes for carrying out the invention is a management system for managing the measurement result measured by a measuring equipment used by the user to measure biological information, the management system including an authentication system for authenticating the measuring device to eliminate the management of the measurement result measured with the measuring equipment which is a non-legitimate article.

One embodiment of the present invention will be described with the drawings.

First Example

Figure 1:
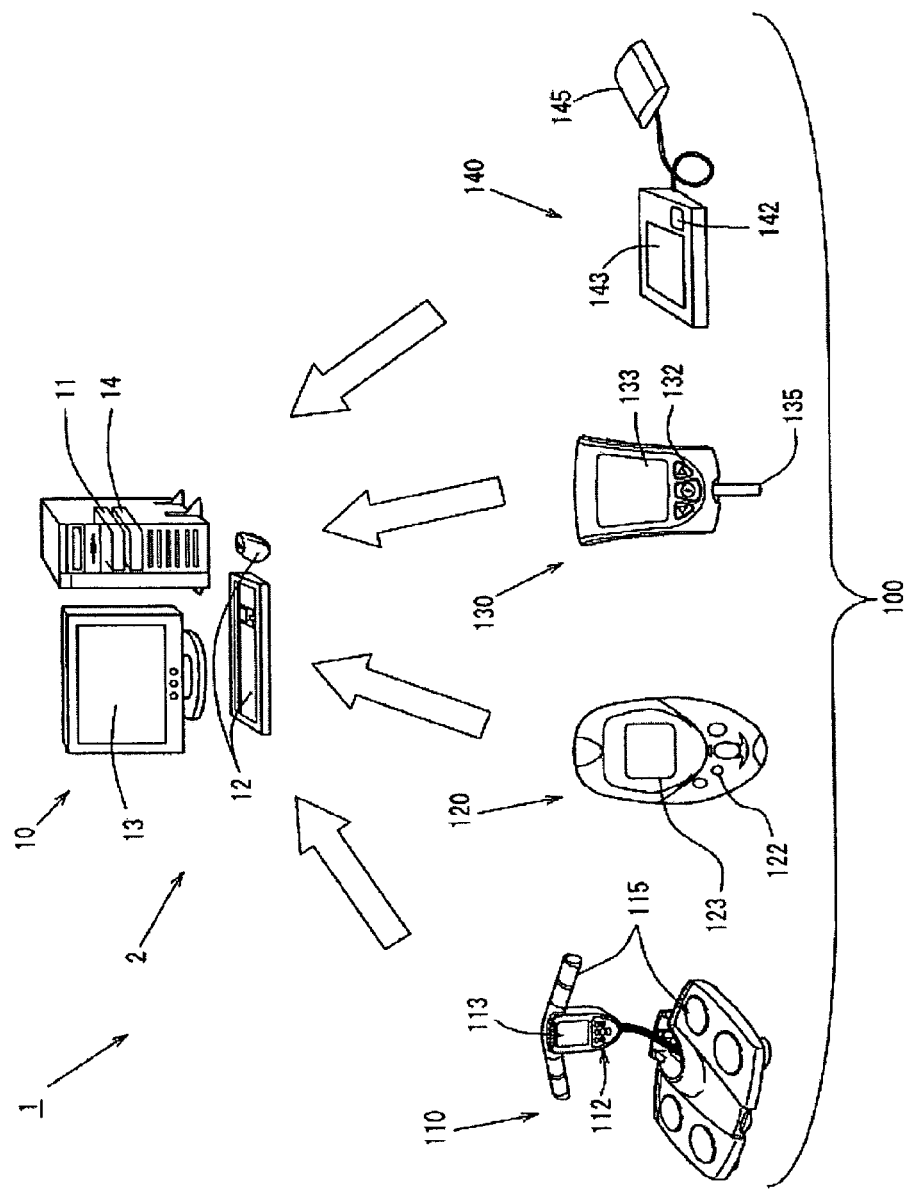
FIG. 1 is a system configuration of a measurement result management system and an authentication system according to a first example of the present invention.
Figure 2:
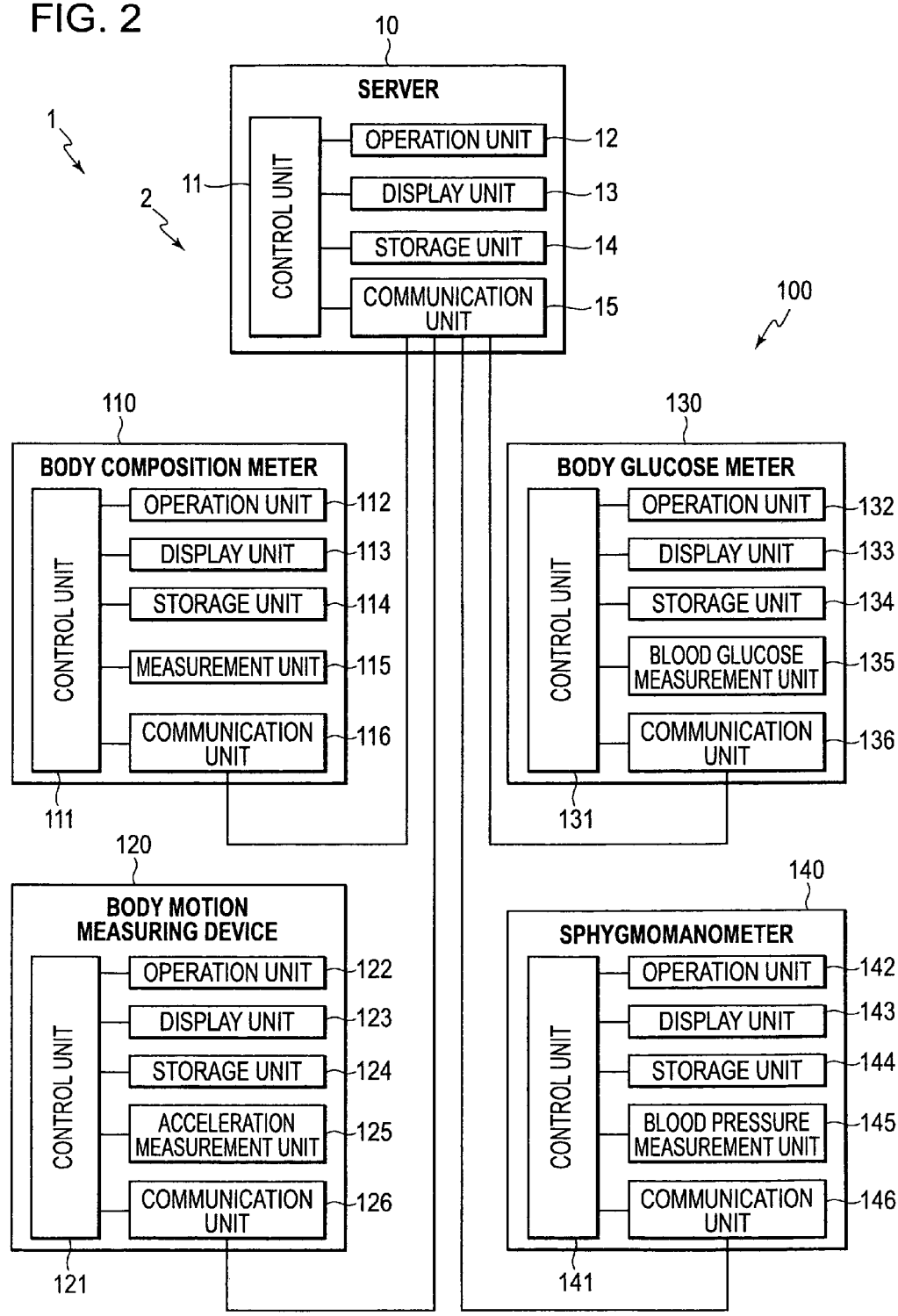
FIG. 2 is a block diagram showing a system configuration of the measurement result management system and the authentication system shown in FIG. 1.

FIG. 1 shows a system configuration diagram of a measurement result management system 1 and an authentication system 2, and FIG. 2 shows a block diagram of the system configuration of the measurement result management system 1 and the authentication system 2.

The measurement result management system 1 is a system configured by a server 10 and a measuring equipment 100 for each user to measure biological information to manage the measurement result of the measuring equipment 100 in the server 10. The measurement result management system 1 includes an authentication system 2 for authenticating the measuring equipment 100 that accesses the server 10.

There are various types of measuring equipments 100 according to the biological information to be measured, but in the present example, the measuring equipment 100 is configured by a body composition meter 110 for measuring weight and body fat percentage, a body motion measuring device 120 for measuring number of steps and activity amount, a blood glucose meter 130 for measuring blood glucose level, and a sphygmomanometer 140 for measuring blood pressure. Other measuring equipments include a thermometer and a cardiograph equipment.

In FIG. 1, the measuring equipment 100 is illustrated to connect one of each of the body composition meter 110, the body motion measuring device 120, the blood glucose meter 130, and the sphygmomanometer 140, but it exists by the number of users using the measurement result management system 1.

The server 10 is an appropriate computer used as a server device, and includes a control unit 11, an operation unit 12, a display unit 13, a storage unit 14 and a communication unit 15.

The control unit 11 is configured by a CPU, a ROM, and a RAM, and executes the control operation and the calculation operation of each unit according to a program stored in the ROM or the like. In this example, the measurement result is received from the measuring equipment 100, and the measurement result is stored in the storage unit 14 for management.

The operation unit 12 is configured by an operation input device such as a keyboard or a mouse, and transmits the operation input signal to the control unit 11.

The display unit 13 is configured by a display device such as a liquid crystal display or a CRT display, and performs display according to a control signal of the control unit 11.

The storage unit 14 is configured by a storage device such as a hard disc, and stores appropriate programs and data.

The communication unit 15 can be configured by an appropriate communication interface suited for data communication with the measuring equipment 100 such as wireless communication by Bluetooth (registered trademark) or infrared light, communication through LAN (Local Area Network), or the like.

The body composition meter 110, which is one measuring equipment 100, is configured by a control unit 111, an operation unit 112, a display unit 113, a storage unit 114, a measurement unit 115, and a communication unit 116.

The control unit 111 is configured by a CPU, a ROM, a RAM, or a microcomputer, and executes the control operation and the calculation operation of each unit according to a program stored in the ROM or the like.

The operation unit 112 is a button for receiving the operation input for displaying the set input and the past measurement result, and transmits a push signal to the control unit 111.

The display unit 113 is configured by a display device such as a liquid crystal screen (see FIG. 1), and displays an image such as characters and figures according to an image signal transmitted from the control unit 111. The specific information to be displayed includes information related to body composition such as measurement result and set information.

The storage unit 114 is configured by a storage device such as a hard disc, and stores appropriate programs and data.

The measurement unit 115 is configured by a body fat percentage measuring portion including a low current circuit, an impedance detecting portion, and an electrode, and a weight measuring portion including a plurality of load cells.

The communication unit 116 is configured by an appropriate interface such as wireless communication or communication through the LAN. In this example, the communication unit 116 transmits the measurement result to the server 10 by wireless communication according to the control signal of the control unit 111.

The body motion measuring device 120, which is one measuring equipment 100, is configured by a control unit 121, an operation unit 122, a display unit 123, a storage unit 124, an acceleration measurement unit 125, and a communication unit 126.

The control unit 121 is configured by a CPU, a ROM, a RAM, or a microcomputer, and executes the control operation and the calculation operation of each unit according to a program stored in the ROM or the like.

The operation unit 122 is configured by a plurality of buttons to be push operated, and transmits the input operation push operated by the user such as the input of the user information including length of stride and height to the control unit 121.

The display unit 123 is configured by a display device such as a liquid crystal screen (see FIG. 1), and displays an image such as characters and figures according to an image signal transmitted from the control unit 121. The specific information to be displayed includes set information or information related to number of walks and activity amount such as number of steps, consumed calorie and walking distance.

The storage unit 124 is configured by a storage device such as a hard disc, and stores appropriate programs and data.

The acceleration measurement unit 125 is configured by a sensor for measuring the acceleration of the change that occurs in the walking, the activity, or the like of the user. The acceleration measurement unit 125 may be configured by a one dimensional acceleration sensor that detects the acceleration of one direction, a two dimensional acceleration sensor that detects the acceleration of two orthogonal directions, or a three dimensional acceleration sensor that detects the acceleration of three orthogonal accelerations, and is most preferably the three dimensional acceleration sensor having the greatest amount of information.

The communication unit 126 is configured by an appropriate interface such as wireless communication or communication through the LAN. In this example, the communication unit 126 transmits the measurement result to the server 10 by wireless communication according to the control signal of the control unit 121.

The blood glucose meter 130, which is one measuring equipment 100, is configured by a control unit 131, an operation unit 132, a display unit 133, a storage unit 134, a blood glucose measurement unit 135, and a communication unit 136.

The control unit 131 is configured by a CPU, a ROM, a RAM, or a microcomputer, and executes the control operation and the calculation operation of each unit according to a program stored in the ROM or the like.

The operation unit 132 is a button for receiving the operation input for displaying the set input and the past measurement result, and transmits a push signal to the control unit 131.

The display unit 133 is configured by a display device such as a liquid crystal screen (see FIG. 1), and displays an image such as characters and figures according to an image signal transmitted from the control unit 131. The specific information to be displayed includes set information or information related to the blood glucose level such as measured blood glucose level and past blood glucose level.

The storage unit 134 is configured by a storage device such as a hard disc, and stores appropriate programs and data.

The blood glucose measurement unit 135 measures the blood glucose level of the user and transmits the measured blood glucose level to the control unit 131. The measurement of the blood glucose level is carried out by a known method such as an electrode method of measuring the current generated when the sugar in the obtained blood and the medicinal solution react, or a colorimetric method of measuring the change in color due to the reaction between the sugar in the blood and the medicinal solution.

The communication unit 136 is configured by an appropriate interface such as wireless communication or communication through the LAN. In this example, the communication unit 136 transmits the measurement result to the server 10 by wireless communication according to the control signal of the control unit 131.

The sphygmomanometer 140, which is one measuring equipment 100, is configured by a control unit 141, an operation unit 142, a display unit 143, a storage unit 144, a blood pressure measurement unit 145, and a communication unit 146.

The control unit 141 is configured by a CPU, a ROM, a RAM, or a microcomputer, and executes the control operation and the calculation operation of each unit according to a program stored in the ROM or the like.

The operation unit 142 is configured by a plurality of buttons to be push operated, and transmits the input operation push operated by the user such as the input of the user information including age and sex to the control unit 141.

The display unit 143 is configured by a display device such as a liquid crystal screen (see FIG. 1), and displays an image such as characters and figures according to an image signal transmitted from the control unit 141. The specific information to be displayed includes set information or information related to the blood pressure and the pulse such as measured blood pressure and pulse and past blood pressure and pulse.

The storage unit 144 is configured by a storage device such as a hard disc, and stores appropriate programs and data.

The blood pressure measurement unit 145 detects the pressure of the cuff pressure controlled by the pump with a pressure sensor, and detects the blood pressure and the pulse.

The communication unit 146 is configured by an appropriate interface such as wireless communication or communication through the LAN. In this example, the communication unit 146 transmits the measurement result to the server 10 by wireless communication according to the control signal of the control unit 141.

FIGS. 3A to 3E are explanatory views showing one part of the data stored in the storage unit 14 of the server 10.

FIG. 3A is a configuration diagram showing the configuration of the data for authentication 50 used for authentication, and the measurement data (51a to 54a) and the authentication data (51b to 54b) to register by users.

The data for authentication 50 stores authentication necessity determination data 50a, authentication execution data 50b and notification determination data 50c.

The authentication necessity determination data 50a is data for determining whether or not to execute authentication. For instance, an appropriate configuration may be adopted such as determining that authentication is necessary if a predetermined period has elapsed from the last authentication, determining that authentication is necessary if a predetermined number of communications is carried out from the last authentication, or determining the necessity of authentication at random using an appropriate calculation formula.

The authentication execution data 50b is data for executing the authentication of the measuring equipment 100. This data may be configured with appropriate data capable of authenticating the measuring equipment 100 such as fixed password or data for creating a one-time password that changes each time.

The notification determination data 50c is data for defining the timing to notify the information of authentication failure to the measuring equipment 100 when the authentication fails. For instance, an appropriate reference data may be adopted such as defining as a predetermined day of every month, defining as after a predetermined number of times or after a predetermined days from the determination of authentication failure, or defining at random.

The authentication necessity determination data 50a and the authentication execution data 50b configured as described are also stored in the storage unit (114, 124, 124, and 144) of each measuring equipment 100. The determination on the necessity of the authentication can be matched and the authentication can be succeeded as necessary by storing the same data in the server 10 and the measuring equipment 100. The authentication execution data 50b may not be the same configuration as long as the configuration can be authenticated such as giving the encryption key data to the measuring equipment 100 side and giving the decoding data to the server 10 side. The dummy data for creating the dummy information is stored in the storage unit (114, 124, 134, and 144) of each measuring equipment 100. The dummy information may be created when the authentication is not necessary.

The data which the server 10 receives from each measuring equipment 100 and stores is configured by a pair of measurement data (51a to 54a) and authentication data (51b to 54b) for every measuring equipment 100.

Specifically describing, the body composition measurement data 51a and the body composition authentication data 51b are stored as the data related to the body composition meter 110.

The number of step measurement data 52a and the number of step authentication data 52b are stored as the data related to the body motion measuring device 120.

The blood glucose measurement data 53a and the blood glucose authentication data 53b are stored as the data related to the blood glucose meter 130.

The blood pressure measurement data 54a and the blood pressure authentication data 54b are stored as the data related to the sphygmomanometer 140.

FIG. 3B shows a data configuration diagram of the body composition measurement data 51a.

The body composition measurement data 51a is configured by the ID, the measurement date and time, and the fat free percentage, the fat free mass, the weight, and the like or the measured measurement information. The ID is thus given for each measurement of the body composition to store with the measurement date and time.

FIG. 3C shows a data configuration diagram of the body composition authentication data 51b.

The body composition authentication data 51b is configured by the ID, the communication date and time, the authentication result, the communication range, and the like.

The communication date and time stores the date and time of receiving the body composition measurement data 51a.

The authentication result stores "dummy" indicating that the authentication is not performed since it is dummy transmission, "success" indicating that the authentication is performed and that the authentication succeeded, and "fail" indicating that the authentication is performed and that the authentication failed.

The communication range stores the ID of the body composition measurement data 51a received through the communication, and indicates the range of the measurement data received through the communication.

FIG. 3D shows a data configuration diagram of the number of step measurement data 52a.

The number of step measurement data 52a is configured by the ID, the measurement date, and the number of steps by time divided in units of one hour as the measurement information. Thus, the ID is given in units of one day and stored with the measurement date.

FIG. 3E shows a data configuration diagram of the number of step authentication data 52b.

The number of step authentication data 52b is configured by the ID, the communication date and time, the authentication result, the communication range, and the like. The data content stored in each item is the same as the body composition authentication data 51b.

In addition, the blood glucose measurement data 53a and the blood pressure measurement data 54a shown in FIG. 3A are stored with the ID, the measurement date and time, and the measurement information, similar to the body composition measurement data 51a and the number of step measurement data 52a. The blood glucose measurement data 53a stores the blood glucose level for the measurement information, and the blood pressure measurement data 54a stores the systolic blood pressure, the diastolic blood pressure, and the pulse as the measurement information.

The blood glucose authentication data 53b and the blood pressure authentication data 54b are stored with the ID, the communication date and time, the authentication result, the communication range, and the like, similar to the blood glucose authentication data 53b and the blood pressure authentication data 54b described above.

Figure 4:
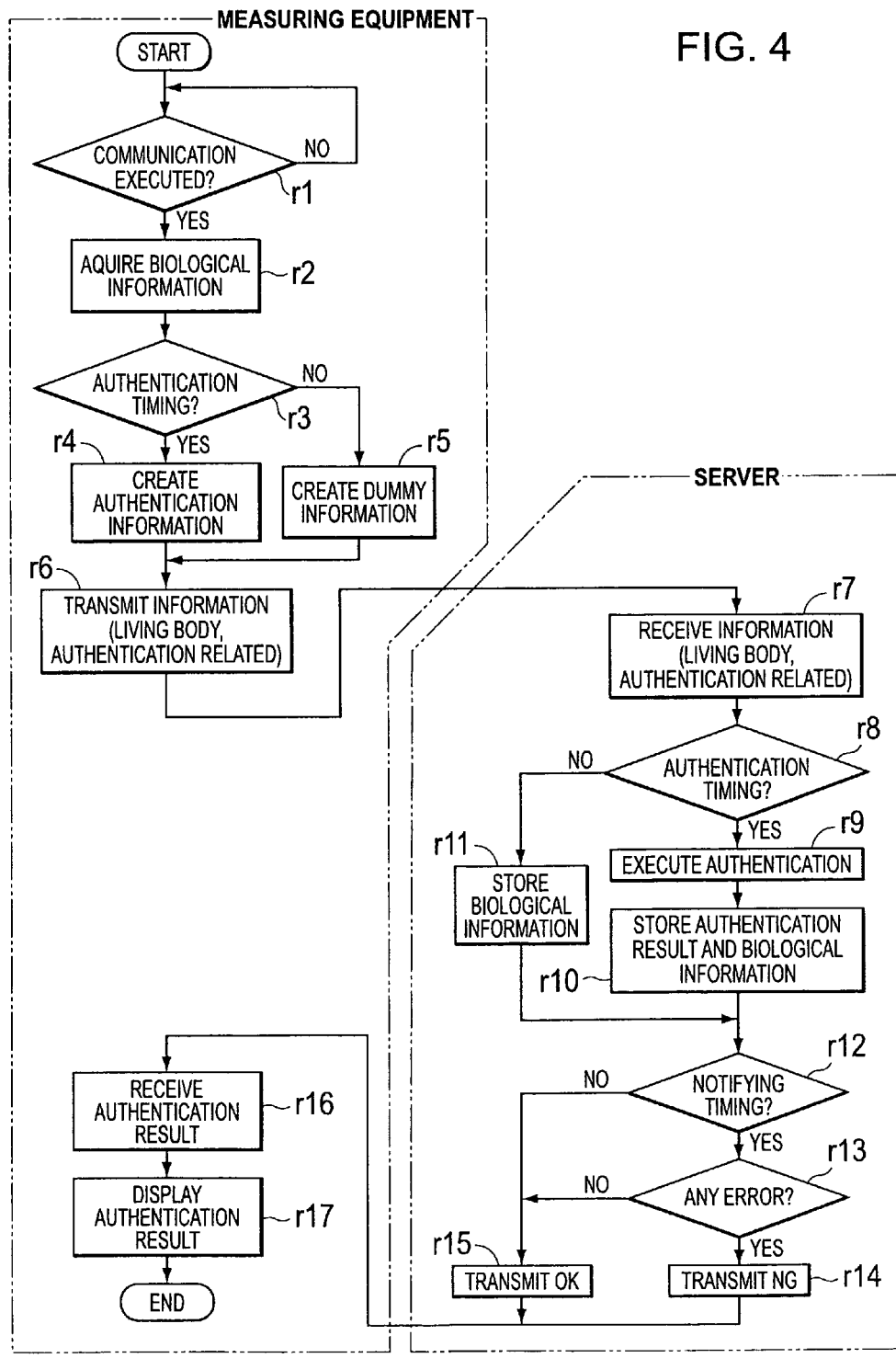
FIG. 4 is a flowchart showing an operation executed by the measuring equipment and the server shown in FIG. 1.

FIG. 4 is a flowchart showing the operation executed by the measuring equipment 100 and the operation executed by the server 10 as the measurement result management system 1.

The measuring equipment 100 waits until the communication is executed by an appropriate trigger (step r1: No). The trigger to execute communication may be at an appropriate time such as when the communication unit (116, 126, 136, or 146) is communicably connected (communication of wired connection or wireless connection is established), or when the data transmission operation is executed with the operation unit (112, 122, 132, or 142).

Although omitted in the figure, an appropriate operation such as measurement process may be executed before the communication is executed.

When the communication is executed (step r1: Yes), the measuring equipment 100 acquires the biological information (body composition, body motion, blood glucose, or blood pressure) from the storage unit (114, 124, 134, or 144) (step r2). In this case, the measurement date and time at which the biological information is measured is acquired. Not limited to the biological information stored in the storage unit, the biological information measured at the time may be acquired.

The measuring equipment 100 references the authentication necessity determination data 50a stored in its storage unit (114, 124, 134, or 144) to perform the determination on whether or not the authentication timing (step r3).

If at the authentication timing (step r3: Yes), the measuring equipment 100 references the authentication execution data 50b stored in its storage unit (114, 124, 134, or 144) to create the authentication information (step r4).

If not at the authentication timing (step r3: No), the measuring equipment 100 references the dummy creating data stored in its storage unit (114, 124, 134, or 144) to create the dummy information (step r5).

The measuring equipment 100 creates the transmission information with the biological information acquired in step r2 and the authentication related information (authentication information or dummy information) created in steps r3 to r5, and transmits the transmission information to the server 10 (step r6).

The server 10 receives the transmission information from the measuring equipment 100, and acquires the biological information and the authentication related information (step r7).

The server 10 references the authentication necessity determination data 50a stored in its storage unit 14 to determine on whether or not the authentication timing (step r8).

If the authentication timing (step r8: Yes), the server 10 executes the authentication (step r9). The authentication is executed by determining whether or not the authentication related information received from the measuring equipment 100 is correct by referencing the authentication execution data 50b stored in the storage unit 14. The authentication related information may include the authentication information or the dummy information, and may include the authentication information when performing the authentication process since the standard for authentication necessity matches in the server 10 and in the measuring equipment 100. Therefore, whether or not a legitimate measuring equipment 100 can be determined by whether or not the authentication is successful based on the data transmitted as the authentication related information.

The server 10 registers the authentication result in step r9 and the biological information received in step r7 as the data of the user corresponding to the measuring equipment 100 that transmitted the data (step r10). In this case, the server 10 adds the ID configured by a sequence number to the received measurement date and time and the biological information, and registers the same. The server 10 stores the data received communication date and time, the authentication result in step r9, and the communication range indicating the range of the biological information received in step r7 in the authentication data (51b to 54b).

If not the authentication timing in step r8 (step r8: No), the server 10 stores the biological information received in step r7 in the storage unit 14 without executing the authentication process (step r11).

In this case, the server 10 adds the ID configured by a sequence number to the received measurement date and time and the biological information and registers the same in the measurement data (51a to 54a). The server 10 stores the data received communication date and time, the "dummy" indicating that the authentication is not executed, and the communication range indicating that the range of the biological information received in step r7 in the authentication data (51b to 54b).

The server 10 determines whether or not it is the timing to notify the authentication result with reference to the notification determination data 50c (step r12).

If the authentication timing has arrived (step r12: Yes), the server 10 references the authentication data (51b to 54b) of the measuring equipment 100 (body composition meter 110, body motion measuring device 120, blood glucose meter 130, sphygmomanometer 140) data received in step r7 to check the presence or absence of error, that is, whether or not there is "authentication failure" in the authentication result item (step r13).

If there is "authentication failure" (step r13: Yes), the server 10 transmits the authentication failure information to the measuring equipment 100 (step r14). The authentication failure information may be transmitted if there is at least one "authentication failure", but determination may be made as authentication successful if there is "authentication successful" after "authentication failure". In this case, the determination is made by whether or not the most recent information other than the dummy is authentication successful or authentication failure. The biological information can be stably accumulated by handling as a normal state even if there is at least one authentication failure if there is authentication successful afterwards, and releasing the excluding process.

If not the notification timing in step r12 (step r12: No), or if there is no authentication failure in step r13 (step r13: No), the server 10 transmits the authentication successful information (step r15).

The server 10 can assume authentication successful even if the dummy information is transmitted with the processes of steps r12 to r15. The legitimate authentication information then can be made unknown to the third person who tries to illegal acquire the authentication information or the dummy information can be made to be false recognized as the legitimate authentication information.

The server 10 can transmit the authentication successful information even if there is authentication failure as long as the notification timing has not arrived. Therefore, even if the third person analyzes the authentication information transmitted immediately before upon receiving the authentication failure, a situation where the authentication information transmitted immediately before is different from the information determined as authentication failure can be obtained. Thus, when the third person tries to illegally acquire the authentication information, the third person cannot know when and based on which information the determination is made as the authentication failure, and the illegal acquisition of the authentication information can be prevented.

The measuring equipment 100 receives the authentication result from the server 10 (step r16), displays the authentication result on its display unit (113, 123, 133, 143) (step r17), and terminates the process.

The authentication result to display on the display unit may be an appropriate display such as displaying only in the case of the authentication failure and not displaying in other cases, or displaying authentication failure in the case of the authentication failure and displaying as authentication successful in other cases. It can be made to appear as if authentication is being carried out even if the dummy information is transmitted and the authentication is not actually carried out thus making the illegal acquisition of the authentication information by the third person difficult.

According to the above configuration and operation, the biological information can be stored regardless of the authentication result. Therefore, the biological information can be accumulated in the server 10 even in the case of the authentication failure, and defect of the biological information can be reduced. Therefore, when doctors and rehabilitation instructors want to look at the fluctuation or the progression of the biological information, decision and advice can be made with reference to the reliably accumulated biological information.

The dummy information can be made to be falsely recognized as the authentication information with respect to the third person who tries to illegally acquire or decode the authentication information or the authentication information may not be discriminated by using the dummy information.

Since the determination on whether or not to execute the authentication is synchronized in the server 10 and in the measuring equipment 100, the authentication with the dummy information can be prevented and authentication can be carried out only when necessary even if the dummy information is transmitted from the biological information measuring device. A case in which the number of authentications can be reduced and the process can be completed at high speed increases.

Since the information on whether or not the authentication failed for the stored biological information is added, the biological information may be stored without omission and then appropriately measured to determine whether or not it is the received biological information.

Since the timing at which authentication failure is determined and the timing at which the reception of the biological information is excluded can be differed, the biological information transmitted during that time can be accumulated, and the defect of the biological information can be reduced. In particular, it is effective when the authentication is normally successful thereafter and the biological information is continuously accumulated, where the biological information at the time of the authentication failure can be stored in the server 10 when the authentication failed but left unattended as he/she is in a rush.

With respect to the biological information stored at the time of the authentication failure, it can be discriminated afterwards by the authentication data (51b to 54b), and thus may be deleted if illegally measured or registered other than by the said person.

Furthermore, since the process related to excluding is executed at the timing different from the time of authentication failure, at which stage of the authentication it became non-authentication can be prevented from being analyzed. Thus, the non-authentication information may not be specified and the analysis of the authentication information may be made more difficult.

Therefore, a system of higher authentication accuracy can be built without applying processing load in the measuring equipment 100 and the server 10 and executing a complex encrypting process.

Second Example

A second example in which the transmission of the authentication information is requested at a predetermined timing in the configuration of the measurement result management system 1 and the authentication system 2 according to the first example shown in FIG. 1 will now be described. The hardware configuration according to the second example is the same as the hardware configuration according to the first example shown in FIG. 1 to FIG. 4, and thus the detailed description thereof will be omitted.

In the storage unit 14 of the second example, the registration information (hereinafter referred to as measuring equipment registration information) related to the registered measuring equipment 100, the measurement result, the authentication information, and the like are stored and managed, and furthermore, the information and program necessary to operate the measurement result management system 1 and the authentication system 2 such as the authentication timing calculation program for creating the authentication timing to execute the authentication process of the measuring equipment 100 that logged in based on a random function and the authentication program for authenticating based on the stored registration information are stored and managed.

In the configuration of the server 10 of the second example, the storage unit 14 for storing the registration information such as the authentication value and the log in ID, the authentication timing calculation program, the authentication program, and the like, and the communication unit 15 that communicates with the control unit 11 that executes the authentication timing calculation program and the authentication program as well as the measuring equipment 100 configure an authentication device in the server 10 for authenticating the measuring equipment 100. Furthermore, the authentication system 2 for authenticating the measuring equipment 100 is configured using the authentication device in the server 10.

FIG. 3 shows an explanatory view of a management table of various types of information, FIG. 4 shows a flowchart on the measurement result registration process, and FIG. 5 shows a flowchart on the non-legitimate measuring equipment excluding process.

As shown in the measuring equipment registration information management table 21 of FIG. 5A, the measuring equipment registration information to be stored in the storage unit 14 stores the unique login ID set for every registered measuring equipment 100, the measurement type measured with the measuring equipment, the authentication value verified to authenticate the measuring equipment 100, and other information.

In the present example, the manufacturing number of the relevant measuring equipment 100 is set in the login ID, and the login ID and the authentication value managed in FIG. 5A are also stored in the storage unit 104 of each measuring equipment 100, as shown in the authentication value management table 101 of FIG. 5B.

Therefore, the login ID and the authentication value associated and managed in the measuring equipment registration information management table 21 of the server 10 and the authentication value management table 101 of the measuring equipment 100 are set at the stage the measuring equipment 100 is manufactured, and stored in the measuring equipment registration information management table 21 and the authentication value management table 101.

Furthermore, as shown in the measurement result management table 22 of FIG. 5C, the unique identification number set for every received measurement result, the login ID transmitted from each measuring equipment 100, the measurement date and time information, the measurement result, and the other information in association with the login ID are stored in the storage unit 14.

As shown in the authentication result management table 23 of FIG. 5D, the unique identification number set for every authentication process, the login ID transferred from each measuring equipment 100, the authentication date and time information, the authentication result, and the other information in association with the login ID are stored in the storage unit 14.

Specifically, as shown in FIG. 5D, "1" is stored for the authentication result when authenticated as the measuring equipment 100, which is a legitimate article, and "0" is stored when not authenticated as the measuring equipment 100, which is a non-legitimate article.

As shown in FIG. 5B, the storage unit 114 stores the authentication value management table 101 in which the login ID based on the manufacturing number of the body composition meter and the authentication value are stored in association, and stores an appropriate program necessary for the body composition meter 110 such as user information set and input in advance by the user, a measurement program for measuring weight and body fat percentage with the measurement unit 115, and a communication control program for controlling the communication unit 116 described later.

As shown in FIG. 5B, the storage unit 124 stores the authentication value management table 101 in which the login ID based on the manufacturing number of the body motion measuring device 120 and the authentication value are stored in association, and stores an appropriate program necessary for the body motion measuring device 120 such as user information set and input in advance by the user, a measurement program and threshold data for counting the number of steps and the activity amount with the acceleration measurement unit 125, and a communication control program for controlling the communication unit 126 described later.

As shown in FIG. 5B, the storage unit 134 stores the authentication value management table 101 in which the login ID based on the manufacturing number of the blood glucose meter 130 and the authentication value are stored in association, and stores an appropriate program necessary for the blood glucose meter 130 such as input information set in advance by the user, a measurement program for measuring the blood glucose level with the blood glucose measurement unit 135, and a communication control program for controlling the communication unit 136 described later.

As shown in FIG. 5B, the storage unit 144 stores the authentication value management table 101 in which the login ID based on the manufacturing number of the sphygmomanometer 140 and the authentication value are stored in association, and stores an appropriate program necessary for the sphygmomanometer 140 such as the user information such as age and sex set in advance set by the user, a measurement program for measuring the blood pressure and the pulse with the blood pressure measurement unit 145, and a communication control program for controlling the communication unit 146 described later.

According to the above configuration, the body composition meter 110 measures the weight and the impedance of the user with the measurement unit 115, and manages the measurement result in the measurement result management table 22 of the storage unit 14 with the login ID information through the wireless communication.

The body motion measuring device 120 measures the number of steps and the activity amount of the user with the acceleration measurement unit 125, and manages the measurement result in the measurement result management table 22 of the storage unit 14 with the login ID information through the wireless communication.

The blood glucose meter 130 measures the blood glucose level of the user with the blood glucose measurement unit 135, and manages the measurement result in the measurement result management table 22 of the storage unit 14 with the login ID information through the wireless communication.

The sphygmomanometer 140 measures the blood pressure and the pulse with the blood pressure measurement unit 145, and manages the measurement result in the measurement result management table 22 of the storage unit 114 with the login ID information through the wireless communication.

Figure 6:
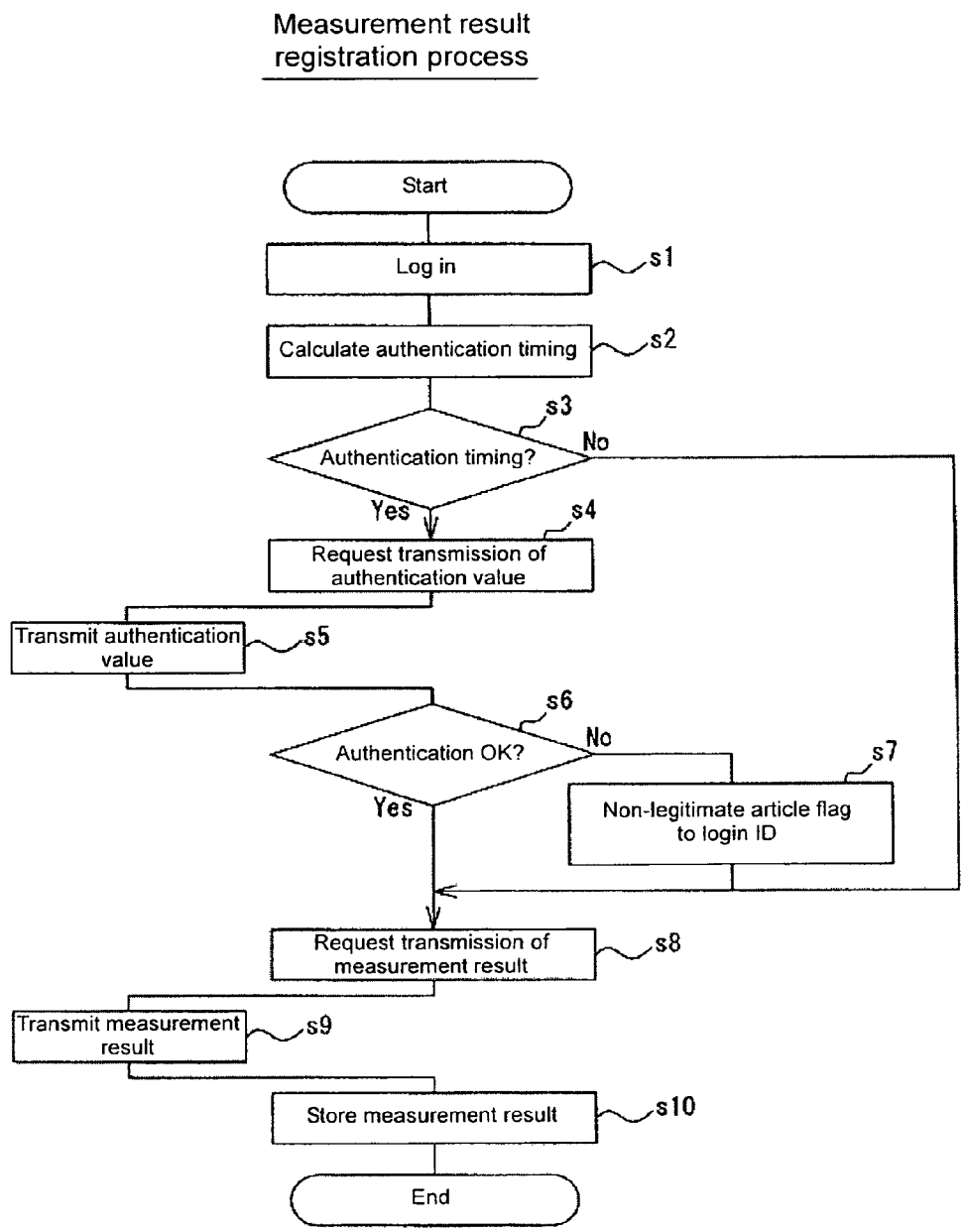
FIG. 6 is a flowchart of a measurement result registration process according to the second example of the present invention.

In the measurement result management system 1 of such configuration, the measurement result registration process of registering the results measured using the measuring equipment 100 will be described with FIG. 6.

First, the user operates his/her measuring equipment 100 and measures the biological information. In the following, a case of registering the weight measurement result measured with the body composition meter 110 in the server 10 will be described.

The user whose weight is measured with the body composition meter 110 operates the body composition meter 110 to transmit the login ID of the body composition meter 110 to be stored in the authentication value management table 101 to the server 10 to log in (step s1).

The server 10 that received the login from the body composition meter 110 calculates the authentication timing based on a random function by the authentication timing calculation program (step s2).

If the login by the body composition meter 110 of this time is not at the authentication timing at which the authentication process is executed as a result of calculating the authentication timing at step s2 (step s3: No), the server 10 transmits a measurement result transmission request (step s8) to transmit the measurement result to the body composition meter 110, and the body composition meter 110 that received the measurement result transmission request from the server 10 transmits the measurement result to the server 10 (step s9).

As shown in FIG. 5C, the server 10 that received the measurement result from the body composition meter 110 stores the received measurement result in the measurement result management table 22 with the login ID (step s10), and terminates the measurement result registration process.

If the login by the body composition meter 110 of this time is the authentication timing at which the authentication process is executed as a result of calculating the authentication timing at step s2 (step s3: Yes), the server 10 transmits an authentication value transmission request to transmit the authentication value to be stored in the authentication value management table 101 in association with the login ID to the body composition meter 110 (step s4).

The body composition meter 110 that received the authentication value transmission request from the server 10 transmits the authentication value to the server 10 (step s5). The server 10 that received the authentication value from the body composition meter 110 verifies with the authentication value stored in association with the login ID in the measuring equipment registration information management table 21 stored in the storage unit 14. If the authentication values match as a result of the verification (step s6: Yes), the server 10 stores the authentication result of "authentication OK" in the measurement result management table 22 and proceeds to step s8, as shown in FIG. 5D. Thereafter, the server 10 performs steps s9 and s10, registers the measurement result, and terminates the measurement result registration process.

If the authentication values match in step s6, that is, in the case of "authentication OK", "1" is stored in the authentication result in the measurement result management table 22.

If the authentication values do not match as a result of the verification of the authentication value by the server 10 that received the authentication value from the body composition meter 110 (step s6: No), the body composition meter 110 that transmitted the authentication value is determined as not a legitimate article having an authentication value managed in association with the login ID based on the manufacturing number in the server 10 in advance.

As shown in FIG. 5D, the server 10 stores "0" indicating no match, that is, "authentication NG" in the authentication result of the measurement result management table 22 (step s7), and proceeds to step s8. Thereafter, the server 10 performs steps s9 and s10 described above, registers the measurement result, and terminates the measurement result registration process.

In the measurement result registration process described above, the authentication process is executed only at the authentication timing created in step s2 instead of being executed in all registration processes of registering the measurement result. The measurement result from the body composition meter 110 is registered even if the authentication process is not performed.

In the measurement result registration process, all the measurement results of the body composition meter 110 logged in in step s1 are registered regardless of the authentication result in step s6. Specifically, even if the authentication values do not match, that is, even if determined that the body composition meter 110 that transmitted the authentication value is a non-authenticated non-legitimate article as a result of verifying the authentication value in step s6, "0" indicating no match is stored in the authentication result of the measurement result management table 22, and then the registration of the measurement result is accepted.

Steps s2 to s7 in the measurement result registration process are authentication processes executed by the server 10 functioning as the authentication system 2.

Figure 7:
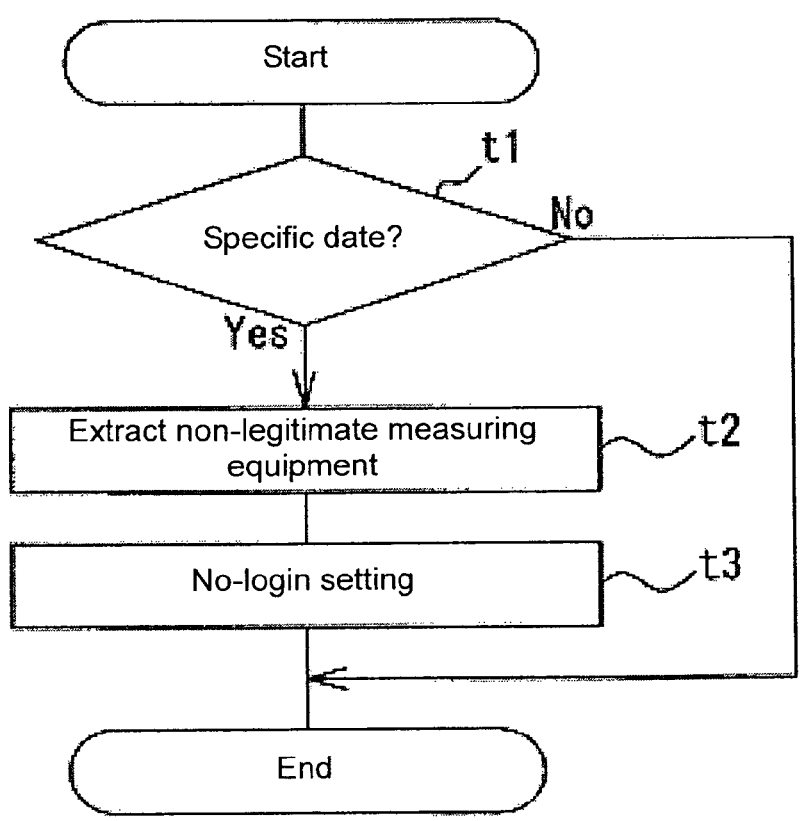
FIG. 7 is a flowchart of a non-legitimate measuring equipment excluding process according to the second example of the present invention.

The non-legitimate measuring equipment excluding process of excluding the use by the body composition meter 110 determined as the non-legitimate article of "authentication NG" as a result of performing the authentication process although the registration of the measurement result is accepted will be described below with FIG. 7 showing the flowchart for the non-legitimate measuring equipment excluding process.

The server 10 that executes the non-legitimate measuring equipment excluding process determines whether or not a specific date of executing the non-legitimate measuring equipment excluding process (step t1). The specific date may be appropriately set so as to be an appropriate interval such as once a week on Friday, once a month on the first day, once every plurality of months, and the like.

If not a specific date (step t1: No), it is not the timing to execute the non-legitimate measuring equipment excluding process, and thus the server 10 terminates the actual non-legitimate measuring equipment excluding process.

If it is the specific date (step t1: Yes), the server 10 extracts the non-legitimate body composition meter 110 in which "0" is stored in the authentication result from the measurement result management table 22 stored in the storage unit 14 (step t2), sets the login ID of the extracted non-legitimate body composition meter 110 to non-usable (step t3), and terminates the actual non-legitimate measuring equipment excluding process.

The non-legitimate measuring equipment excluding process is a process executed by the server 10 that functions as the authentication system 2.

The process using the body composition meter 11 has been described for the measurement result registration process and the non-legitimate measuring equipment excluding process, but may be the measuring equipment 100 of the body composition measuring device 120, the blood glucose meter 130, and the sphygmomanometer 140 other than the body composition meter 110, where similar processes can be carried out in this case as well.

As described above, the authentication system (authentication system 2) configured by the user equipment (measuring equipment 100 (body composition meter 110, body motion measuring device 120, blood glucose meter 130, sphygmomanometer)) used by the user and the authentication device (server 10 that executes step s6) for authenticating the user equipment (measuring equipment 100) includes an authentication information storage means (authentication value management table 101) for storing the authentication information (authentication value) for authentication by the authentication device (server 10 that executes step s6) and an authentication information transmission means (communication unit 106 (116, 126, 136, 146) for transmitting the authentication value in step s5) for transmitting the authentication information (authentication value) to the authentication device (server 10 that executes step s6) at a controlled predetermined timing (authentication timing) in the user equipment (measuring equipment 100), and also includes an authentication information storage means (measuring equipment registration information management table 21) for storing authentication information (authentication value) of a plurality of user equipments (measuring equipment 100), an authentication information receiving means (communication unit 15) for receiving the authentication information (authentication value) transmitted from the user equipment (measuring equipment 100), and an authentication means (control unit 11 that executes step s6) for verifying the authentication information (authentication value) received by the authentication information receiving means (communication unit 15) with a plurality of authentication information (authentication value) stored in the authentication information storage means (measuring equipment registration information management table 21) and authenticates when the matching authentication information (authentication value) is stored in the authentication device (server 10 that executes step s6).

The user equipment (measuring equipment 100) can be accurately authenticated without imposing processing load on the user equipment (measuring equipment 100) and the management server (server 10).

For instance, compared to the measurement result registration process in which the user equipment (measuring equipment 100) transmits the authentication information (authentication value) every time it communicates with the management server (server 10) and registers the measurement result, the user equipment (measuring equipment 100) transmits the authentication information (authentication value) to the authentication device (server 10 that executes step s6) at the controlled predetermined timing (authentication timing), and hence the authentication information (authentication value) to be transmitted is less likely to be intercepted and the analysis of the authentication information (authentication value) becomes difficult. Therefore, the authentication that is less likely to be analyzed can be realized without executing the complex encryption processing of high processing load.

The authentication system (authentication system 2) includes a timing control means (server 10 that calculates the authentication timing in step s2) for controlling the predetermined timing (authentication timing) of making a request for transmitting the authentication information (authentication value) to the authentication device (server 10 that executes step s6), and an authentication information transmission request means (server 10 that executes step s4) for requesting the transmission of the authentication information (authentication value) at the predetermined timing (authentication timing) with respect to the user equipment (measuring equipment 100).

The predetermined timing (authentication timing) at which the user equipment (measuring equipment 100) transmits the authentication information (authentication value) to the authentication device (server 10 that executes step s6) is controlled by the timing control means (server 10 that calculates the authentication timing in step s2), the transmission of the authentication information (authentication value) can be requested with respect to the user equipment (measuring equipment 100) at the controlled predetermined timing (authentication timing), and the user equipment (measuring equipment 100) can be accurately authenticated without complicating the user equipment (measuring equipment 100) and without imposing processing load on the user equipment (measuring equipment 100) and the management server (server 10).

In the authentication system 2, a non-authentication process executing timing control means (server 10 that executes non-legitimate measuring equipment excluding process) includes a non-authentication equipment storage means (authentication result management table 23) for storing the user equipment (measuring equipment 100) not authenticated by the authentication means (control unit 11 that executes steps 6) in the authentication device (server 10 that executes step s6) and executes the process (no-log in setting of step t3)

related to non-authentication on the non-authenticated user equipment (measuring equipment 100) at a timing different from the time of non-authentication (step s6: No) by the authentication means (control unit 11 that executes step s6), and hence an authentication that is more difficult to be analyzed can be realized.

Specifically, the process related to non-authentication (no-log in setting of step t3) is executed at a timing different from the time of no-authentication (step s6: No) by the authentication means (control unit 11 that executes step s6) by the non-authentication process executing timing control means (server 10 that executes non-legitimate measuring equipment excluding process), and thus the authentication of which stage is non-authenticated cannot be analyzed so that the non-authentication information (authentication value of authentication NG) cannot be specified, and the analysis of the authentication information (authentication value) can be made more difficult.

Therefore, the authentication system (authentication system 2) of higher authentication accuracy can be built without executing the complex encryption processing of high processing load, that is, without imposing processing load on the user equipment (measuring equipment 100) or the management server (server 10).

The above described user equipment (measuring equipment 100) may be a measuring equipment such as an electrocardiograph or a thermometer other than the body composition meter 110, the body motion measuring device 120, the blood glucose meter 130, or the sphygmomanometer 140, and may also be an equipment used by the user such as a treatment device or a massager whose data such as usage record, user setting, and the like are managed in the server 10.

The authentication function for calculating the authentication value by a predetermined condition may be used for the authentication information other than the authentication value for the authentication information.

For the process related to non-authentication in the non-legitimate measuring equipment excluding process, the no-login setting in which the log in from the non-authenticated user equipment (measuring equipment 100), that is, the measuring equipment 100 determined as the non legitimate article or not a legitimate article is not accepted is executed, but display may be made as no-authentication with respect to the display unit 103 (113, 123, 133, 143) of the non-authenticated user equipment (measuring equipment 100).

On the basis of the authentication information (authentication value) transmitted from the user equipment (measuring equipment 100 such as body composition meter 110, body motion measuring device 120, blood glucose meter 130, sphygmomanometer 140, etc.) used by the user, the authentication device (server 10 that executes step s6) for authenticating the user equipment (measuring equipment 100) includes an authentication information storage means (measuring equipment registration information management table 21) for storing the authentication information (authentication value) for every user equipment (measuring equipment 100), and an authentication means (control unit 11 that executes step s6) for receiving the authentication information (authentication value) transmitted from the user equipment (measuring equipment 100) at the controlled predetermined timing (authentication timing) and verifies the same with the authentication information (authentication value) stored in the authentication information storage means (measuring equipment registration information management table 21) for authentication, so that the user equipment (measuring equipment 100) can be accurately authenticated without imposing processing load on the user equipment (measuring equipment 100) and the management server (server 10).

The user equipment (measuring equipment 100) including an authentication information storage means (authentication value management table 101) for storing the authentication information (authentication value) for authentication by the authentication device (server 10 that executes step s6), and an authentication information transmission means (communication unit 106 that transmits authentication value in step s5) for transmitting the authentication information (authentication value) at the controlled predetermined timing (authentication timing) with respect to the authentication device (server 10 that executes step s6) is accurately authenticated by the authentication device (server 10 that executes step s6) without imposing processing load on the user equipment (measuring equipment 100) and the management server (server 10).

Furthermore, the management system (measurement result management system 1) including the user equipment (measuring equipment 100) used by the user and the management server (server 10) communicating with the user equipment (measuring equipment 100) includes a management information transmission means (communication unit 106 that transmits measurement result in step s9) for transmitting the information (measurement result) of the user to the management server (server 10), an authentication information storage means (authentication value management table 101) for storing the authentication information (authentication value) authenticated by the management server (server 10), and an authentication information transmission means (communication unit 106 that transmits authentication value in step s5) for transmitting the authentication information (authentication value) to the management server (server 10) at the controlled predetermined timing (authentication timing) in the user equipment (measuring equipment 100), and includes a management information reception means (communication unit 15) for receiving information managed by the user in the management server (server 10), and also includes an authentication information storage means (measuring equipment registration information management table 21) for storing the authentication information (authentication value) of a plurality of user equipments (measuring equipment 100), an authentication information reception means (communication unit 15) for receiving the authentication information (authentication value) transmitted from the user equipment (measuring equipment 100) and an authentication means (control unit 11 that executes step s6) for verifying the authentication information (authentication value) received by the authentication information reception means (communication unit 15) with the plurality of authentication information (authentication value) stored in the authentication information storage means (measuring equipment registration information management table 21) and authenticating if the matching authentication information (authentication value) is stored.

Therefore, the user equipment (measuring equipment 100) can be accurately authenticated and the information (measurement result) of the user equipment (measuring equipment 100) can be managed without imposing processing load on the user equipment (measuring equipment 100) and the management server (server 10).

In the measurement result registration process of the management system (measurement result management system 1), the authentication process is not executed in all registration processes for registering the measurement results and the authentication process is executed only at a predetermined timing (authentication timing) created in step s2. The measurement result from the user equipment (measuring equipment 100) can be registered even if the authentication process is not performed.

In the measurement result registration process, all the measurement results of the user equipment (measuring equipment 100) logged in in step s1 are registered regardless of the authentication result in step s6. Specifically, even if the authentication values do not match, that is, even if determined that the user equipment (measuring equipment 100) that transmitted the authentication value is a non-authenticated non-legitimate article as a result of verifying the authentication value in step s6, the registration of the measurement result can be accepted.

Therefore, in the measurement result registration process of the management system (measurement result management system 1), the analysis of the authentication information (authentication value) for authenticating the user equipment (measuring equipment 100) becomes difficult and the information (measurement result) of the user equipment (measuring equipment 100) can be reliably managed.

Third Example

Figure 9:
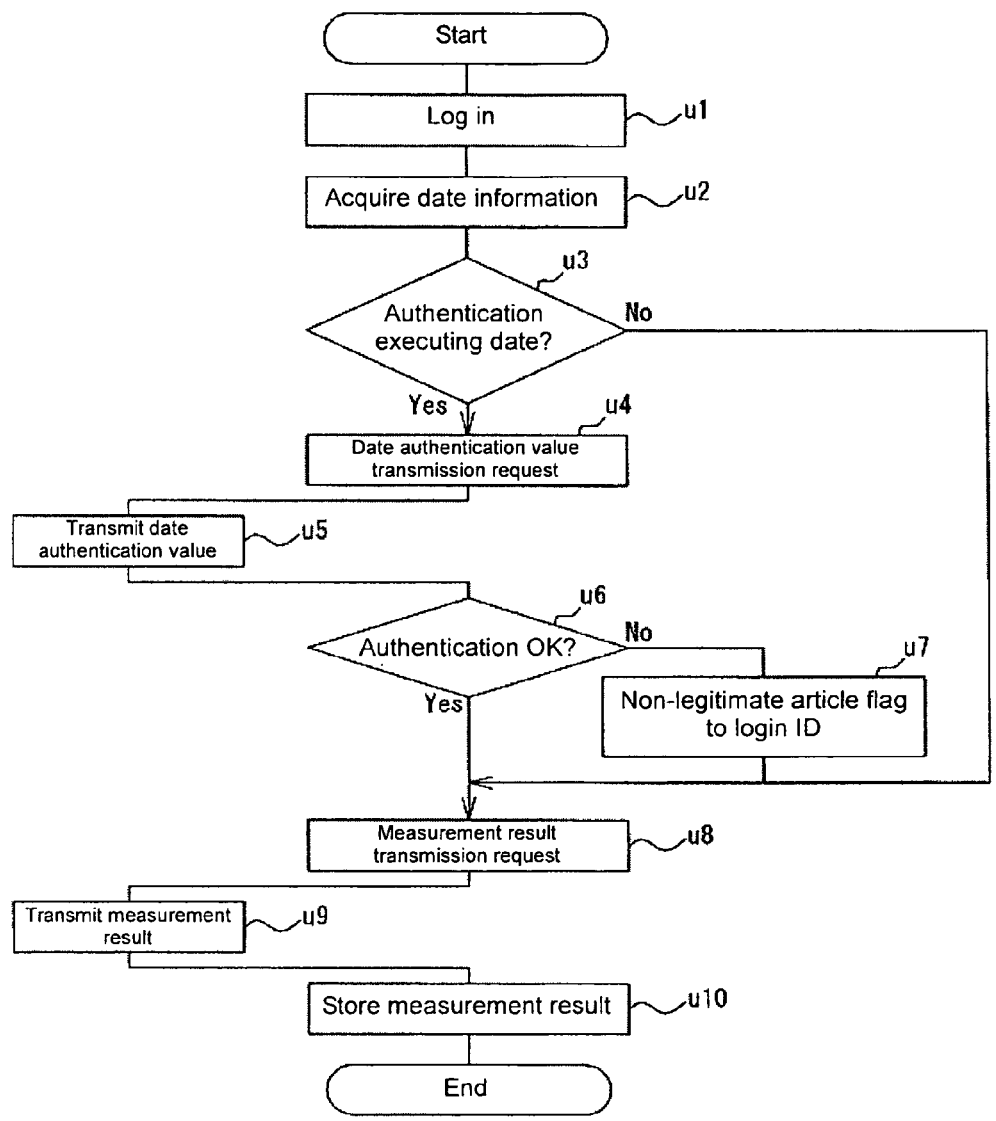
FIG. 9 is a flowchart of a measurement result registration process using a date authentication value according to the third example of the present invention.

A third example in which a date authentication value where the authentication value of the measuring equipment 100 is related to date is used in the configuration of the measurement result management system 1 and the authentication system 2 according to the first example shown in FIG. 1 will be described with FIGS. 8A and 8B and FIG. 9. FIGS. 8A and 8B show explanatory views of the management table of various types of information, and FIG. 9 shows a flowchart of the measurement result registration process using the date authentication value.

The hardware configuration according to the third example is the same as the hardware configuration according to the first example shown in FIG. 1 to FIG. 4, and hence the detailed description thereof will be omitted.

The date authentication value used in the present example is stored in association with the login ID of the measuring equipment 100, similar to the authentication value used in the above examples as shown in the measuring equipment registration information management table 21 and the authentication value management table 101 in FIGS. 8A and 8B.

Furthermore, the date authentication value includes information related to date, and it is stored in the measuring equipment registration information management table 21 and the authentication value management table 101 in association with the related date information.

Specifically, the date authentication value is configured by combining a date information portion (indicated with Δ in the date authentication value column in FIGS. 8A and 8B) arranged at the front side portion of the date authentication value, and an authentication value portion (indicated with o in the date authentication value column in FIGS. 8A and 8B) at the back portion. The date information configuring the date information portion on the front side of the date authentication value is stored in the related date column of the measuring equipment registration information management table 21 and the authentication value management table 101.

For the date information, a certain day of once a month is assumed as a date for setting the date authentication value, which is defined in advance for a predetermined period (e.g., for ten years) to set the date authentication value (120 values), and the date authentication value and the date information thereof are stored in the measuring equipment registration information management table 21 and the authentication value management table 101.

The measurement result registration process using the date authentication value by the measurement result management system 1 and the authentication system 2 having the date authentication value including the date information and the date information thereof stored in the measuring equipment registration information management table 21 and the authentication value management table 101 will be described for a case of registering the weight measurement result measured with the body composition meter 110 in the server 10, similar to the above examples.

Similar to the second example, the server 10 that accepted the log in (step u1) from the body composition meter 110 of the user acquires the current date information from the timing unit (not shown) (step u2).

The server 10 determines whether or not the authentication executing day for executing the authentication based on the date information acquired in step u2 (step u3). The server 10 may determine whether or not the authentication executing day from whether or not the date of the date authentication value set in advance, or the authentication executing day maybe calculated based on a random function and the calculated day may be set as the authentication executing day.

If the server 10 determines as not the authentication executing day (step u3: No), the processes similar to steps s8 to s10 of the measurement result registration process of the second example are carried out, the measurement results are stored, and the measurement result registration process is terminated (steps u8 to u10).

If the server 10 determines as the authentication executing day (step u3: Yes), the server 10 transmits a date authentication value transmission request to the body composition meter 110 to transmit the date authentication value stored in the authentication value management table 101 in association with the login ID (step u4).

The body composition meter 110 that received the date authentication value transmission request information extracts the date information that matches the received date from the related date column of the authentication value management table 101, and transmits the date authentication value stored in the authentication value management table 101 in association with the date information to the server 10 (step u5).

The server 10 that received the date authentication value from the body composition meter 110 verifies with the date authentication value corresponded to the date information acquired in step u2 of the date authentication values stored in association with the login ID in the measuring equipment registration information management table 21 stored in the storage unit 14.

If matched with the received date authentication value as a result of the verification (step u6: Yes), the processes similar to steps s8 to s10 of the second example are carried out, the measurement results are stored, and the measurement result registration process is terminated (steps u8 to u10).

If not matched with the received date authentication value as a result of the verification, that is, if "authentication NG" (step u6: No), the server 10 determines that the body composition meter 110 that transmitted the date authentication value is not a legitimate article having the date authentication value to be managed in association with the login ID and the date information based on the manufacturing number in the server 10 in advance.

Similar to the process of when "authentication NG" in the second example (step s6: No), the server stores "0" indicating no match (step u7), and proceeds to step u8. Thereafter, the server 10 carries out steps u9 and u10, registers the measurement result, and terminates the measurement result registration process.

T the non-legitimate measuring equipment excluding process of excluding the use by the body composition meter 110 determined as a non-legitimate article as a result of the authentication in the measurement result registration process is the same as the non-legitimate measuring equipment excluding process executed by the server 10 that functions as the authentication system 2 in the second example, and thus the description thereof will be omitted.

The process using the body composition meter 110 has been described for the measurement result registration process and the non-legitimate measuring equipment excluding process, but may be the measuring equipment 100 of the body motion measuring device 120, the blood glucose meter 130, and the sphygmomanometer 140 other than the body composition meter 110, in which case, similar processes are carried out.

Therefore, the measurement result management system 1 and the authentication system 2 that execute the measurement result registration process using the date authentication value assume the authentication information (authentication value) as the date and time related authentication information (date authentication value) related to the date and time information (date information) related to date and/or time, where the authentication information transmission means (communication unit 106 that transmits authentication value in step u5) transmits the date and time related authentication information (date authentication value) related to date and time of the predetermined timing (authentication executing date).

In other words, in the measurement result registration process using the date authentication value of the management system (measurement result management system 1), the authentication process is not executed in all the registration processes of registering the measurement results and the authentication process is executed only at a predetermined timing (authentication executing day) to execute the authentication, but the measurement result from the user equipment (measuring equipment 100) can be registered even if the authentication process is not carried out.

In the measurement result registration process described above, the measurement result of the user equipment (measuring equipment 100) that logged in can all be registered regardless of the authentication result in step u6. Specifically, the registration of the measurement result can be accepted even if not matching the date and time related authentication information (date authentication value) as a result of verifying the date and time related authentication information (date authentication value) in step u6, that is, even if determining that the user equipment (measuring equipment 100) that transmitted the date and time related authentication information (date authentication value) is a non-authenticated non-legitimate article.

Therefore, effects similar to when executing the measurement result registration process and the non-legitimate measuring equipment excluding process in the second example are obtained, and the user equipment (measuring equipment 100) transmits the date and time related authentication information (date authentication value) related to the date and time of the predetermined timing (authentication executing date), so that the authentication with the advanced and hard to analyze authentication value that changes according to the predetermined timing (authentication executing date) can be realized without imposing processing load on the user equipment (measuring equipment 100) and the management server (server 10).

In the measurement result registration process using the date authentication value of the management system (measurement result management system 1) of the present example, the analysis of the authentication information (authentication value) for authenticating the user equipment (measuring equipment 100) becomes difficult, and the information (measurement result) of the user equipment (measuring equipment 100) can be reliably managed.

The date and time related authentication information (date authentication value) is configured with the authentication value combining the date and time information (date information) and the authentication value, but may be an authentication value configured only with the date and time information (date information), or may be an authentication function for calculating the date and time related authentication information (date authentication value) from the date and time information (date information).

Fourth Example

Figure 10:
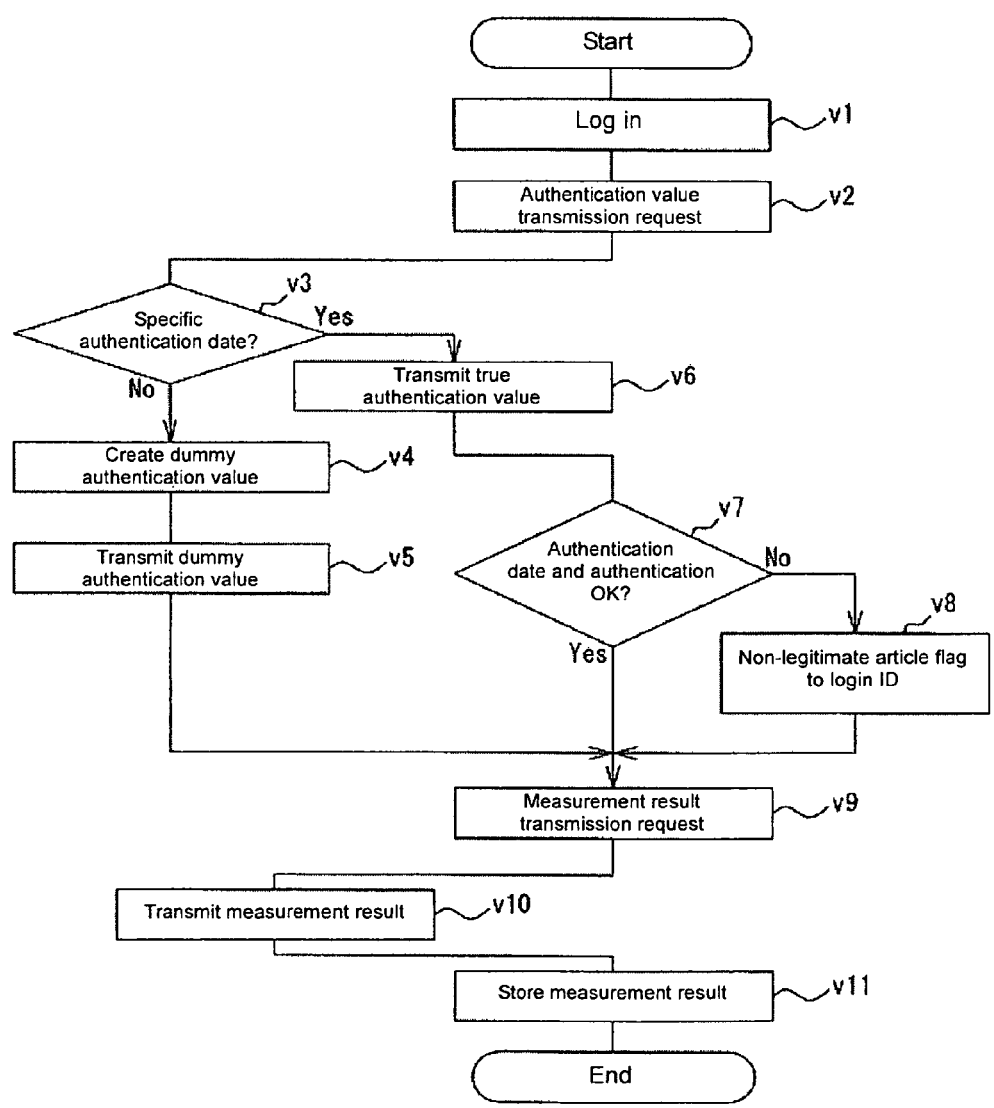
FIG. 10 is a flowchart of a measurement result registration process using a dummy authentication value according to a fourth example of the present invention.

The measurement result registration process using a dummy authentication value for transmitting a dummy authentication value at normal times and transmitting a true authentication value only on a specified authentication date or a predetermined timing in the configuration of the measurement result management system 1 and the authentication system 2 according to the first example shown in FIG. 1 will now be described with FIG. 10. FIG. 10 shows a flowchart of the measurement result registration process using the dummy authentication value.

The hardware configuration according to the fourth example is the same as the hardware configuration according to the first example shown in FIG. 1 to FIG. 4, and thus the detailed description thereof will be omitted.

The true authentication value used in the present example is stored in association with the login ID of the measuring equipment 100, similar to the authentication value used in the above example.

Furthermore, the specific authentication date or the date to execute authentication by the true authentication value is stored in the measuring equipment registration information management table 21 and the authentication value management table 101 of the present example. Similar to the date authentication value in the third example, the true authentication value may be configured by combining the date information portion of the specific authentication date of executing the authentication and the authentication value portion of the back portion.

A dummy authentication value creating program for creating a dummy authentication value or a stored non-significant authentication value is stored in the storage unit 104 (114, 124, 134, 144) of the measuring equipment 100.

The measurement result registration process using the dummy authentication value created with the dummy authentication value creating program will now be described for when registering the weight measurement result measured with the body composition meter 110 in the server 10, similar to the above example.

First, similar to the second example, the server 10 that accepted the log in (step v1) from the body composition meter 110 of the user transmits the authentication value transmission request to transmit the authentication value every time the login is accepted (step v2).

The body composition meter 110 that received the authentication value transmission request from the server 10 acquires the current date information from the timing unit (not shown) and verifies with the specific authentication date stored in the authentication value management table 101 to determine whether or not the specific authentication date (step v3).

If the body composition meter 110 determines as the specific authentication date (step v3: Yes), the true authentication value to be stored in the authentication value management table 101 is transmitted (step v6), similar to step v5 in the measurement result registration process of the second example.

The server 10 that received the true authentication value from the body composition meter 110 acquires the date information from the timing unit (not shown) and determines whether or not the specific authentication date to be stored in the measuring equipment registration information management table 21, and also verifies the true authentication value (step v7).

If it is the specific authentication date as a result of the verification and the matching true authentication value is stored in the measuring equipment registration management table 21 (step v7: Yes), the server 10 stores the authentication result of "authentication OK" in the measurement result management table 22, and proceeds to step v9. Subsequent processes (steps v9 to v11) are processes similar to steps s8 to s10 in the second example, and thus the description will be omitted.

If the matching specific authentication date or the true authentication value is not stored for least one of the specific authentication date or the true authentication value as a result of the verification on the specific authentication date and the true authentication value by the server 10 that received the true authentication value from the body composition meter 110 (step v7: No), the body composition meter 110 that transmitted the true authentication value is determined as not the legitimate article.

The server 10 stores the authentication result of "authentication NG" in the measurement result management table 22 (step v8) and proceeds to step v9. Subsequent processes (steps v9 to v11) are processes similar to steps s8 to s10 in the second example, and thus the description will be omitted.

If the body composition meter 110 determines as not the specific authentication date (step v3: No), the body composition meter 110 creates a dummy authentication value or an non-significant authentication value with the dummy authentication value creating program stored in the storage unit 114 (step v4), and transmits the created authentication value to the server 10 (step v5).

The server 10 that received the dummy authentication value from the body composition meter 110 performs processes similar to steps s8 to s10 in the second example without authenticating the body composition meter 110 (steps v9 to v11) and terminates the measurement result registration process using the dummy authentication value.

In the measurement result registration process using the dummy authentication value, the non-legitimate measuring equipment excluding process for excluding the use by the body composition meter 110 determined as the non-legitimate article although the authentication process is carried out with the authentication value on the specific authentication date is the same as the non-legitimate measuring equipment excluding process executed by the server 10 functioning as the authentication system 2 in the second example, and thus the description will be omitted.

The processes using the body composition meter 110 have been described for the measurement result registration process using the dummy authentication value and the non-legitimate measuring equipment excluding process, but may be the measuring equipment 100 such as the body motion measuring device 120, the blood glucose meter 130 and the sphygmomanometer 140 other than the body composition meter 110, in which case similar processes are performed.

Therefore, the measurement result management system 1 and the authentication system 2 that execute the measurement result registration process using the dummy authentication value store the dummy authentication value creating program in the storage unit 104 of the user equipment (measuring equipment 100) and create the dummy authentication information (dummy authentication value) different from the authentication information (true authentication value) by means of a dummy authentication information creating means (measuring equipment 100 that executes the dummy authentication value creating program in step v4), transmits the dummy authentication information (dummy authentication value) at a timing other than the predetermined timing (specific authentication date) by means of a dummy authentication information transmission means (communication unit 106 that transmits the dummy authentication value in step v5).

That is, in the measurement result registration process using the dummy authentication value of the management system (measurement result management system 1), transmission and reception of the authentication value are carried out as if executing the authentication process in all the registration processes of registering the measurement result, but the authentication process by the true authentication information (true authentication value) may be executed only at a predetermined timing (specific authentication date), and the dummy authentication information (dummy authentication value) or a non-significant authentication value may be transmitted at a timing other than the predetermined timing (specific authentication date) and the authentication process may not be carried out. Therefore, the measurement result from the user equipment (measuring equipment 100) can be registered even if the dummy authentication information (dummy authentication value) is transmitted.

In the measurement result registration process described above, all the measurement results of the user equipment (measuring equipment 100) that logged in can be registered regardless of the authentication result in step v7. Specifically, the registration of the measurement result can be accepted even if the authentication information (authentication value) does not match as a result of verifying the authentication information (authentication value) in step v7, that is, even if the user equipment (measuring equipment 100) that transmitted the authentication information (authentication value) is determined as the non-authenticated non-legitimate article.

Therefore, effects similar to when executing the measurement result registration process and the non-legitimate measuring equipment excluding process in the second example can be obtained, and the authentication that is more difficult to analyze can be realized.

Specifically, even if the authentication communication by the dummy authentication value is intercepted, the interceptor cannot specify that it is the dummy authentication value, so that the analysis of regularity or the like in the analysis of the authentication information (authentication value) becomes very difficult as the dummy authentication value is non-significant and a more accurate authentication can be realized without imposing processing load on the user equipment (measuring equipment 100) and the management server (server 10).

In the measurement result registration process using the dummy authentication value of the management system (measurement result management system 1) of the present example, the analysis of the authentication information (authentication value) for authenticating the user equipment (measuring equipment 100) becomes difficult, and the information (measurement result) of the user equipment (measuring equipment 100) can be more reliably managed.

In the above described first to fourth examples, the measuring equipment 100 and the server 10 data communicate the authentication value, the measurement result, and the like by wireless communication by the communication unit 106, but similar effects can be obtained with a configuration of data communicating using an electric communication line such as Internet.

In the correspondence of the configuration of the present invention and the embodiment described above, a management device of the present invention corresponds to the server 10 of the embodiment, and similarly, a storage means corresponds to the storage unit 14, a communication means corresponds to the communication unit 15, authentication related information corresponds to the body composition authentication data 51b, the number of step authentication data 52b, the blood glucose authentication data 53b, and the blood pressure authentication data 54, determination result information corresponds to the authentication results of the body composition authentication data 51b, the number of step authentication data 52b, the blood glucose authentication data 53b, and the blood pressure authentication data 54, a biological information measuring device corresponds to the measuring equipment 100 (body composition meter 110, body motion measuring device 120, blood glucose meter 130, sphygmomanometer 140), a biological information measurement means corresponds to the measurement unit 115, the acceleration measurement unit 125, the blood glucose measurement unit 135, and the blood pressure measurement unit 145, a communication means corresponds to the communication unit 116, 126, 136, 146, an authentication execution necessity determining means corresponds to the measuring equipment 100 (body composition meter 110, body motion measuring device 120, blood glucose meter 130, sphygmomanometer 140) that executes step r3, an authentication related information transmission means corresponds to the measuring equipment 100 (body composition meter 110, body motion measuring device 120, blood glucose meter 130, sphygmomanometer 140) that executes step r6, an information receiving step corresponds to step r7, an authentication execution necessity determining means corresponds to the server 10 that executes step r8, an authentication step corresponds to step r9, an authentication means corresponds to the server 10 that executes step r9, a biological information storage process step corresponds to steps r10, r11, a biological information storage processing means corresponds to the server 10 that executes steps r10, r11, an excluding means corresponds to the server 10 that executes steps r12 to r15, a biological information corresponds to body composition information (fat free percentage, fat free mass, weight), number of step information, blood glucose information (blood glucose level), and blood pressure information (systolic blood pressure, diastolic blood pressure, pulse rate), a first condition corresponds to authentication failure, and a second condition corresponds to reaching a notification timing, where the present invention is not limited to the embodiments described above, and a great many embodiments may be obtained.

INDUSTRIAL APPLICABILITY

The present invention can be used in a system for managing biological information measured with various biological information measuring devices such as a measuring equipment including a body composition meter, a thermometer, a body motion measuring device (pedometer or activity amount meter), a sphygmomanometer, and a cardiograph equipment, or an equipment used by the user such as a treatment device or a massager.

DESCRIPTION OF SYMBOLS

10 server
14 storage unit
15 communication unit
51b body composition authentication data
52b number of step authentication data
53b blood glucose authentication data
52d blood pressure authentication data
100 measuring equipment
110 body composition meter
115 measurement unit
120 body motion measuring device
125 acceleration measurement unit
130 blood glucose meter
135 blood glucose measurement unit
140 sphygmomanometer
145 blood pressure measurement unit
116, 126, 136, 146 communication unit

The invention claimed is:

1. A biological information management system comprising a biological information measuring device including a biological information measurement means for measuring biological information and a communication means for transmitting the biological information, and a management device including a communication means for communicating with the biological information measuring device and a storage means for storing the biological information acquired through the communication means; wherein the biological information measuring device includes
an authentication related information transmission means for transmitting authentication related information related to authentication of the biological information measuring device when transmitting the biological information with the communication means, and
an authentication execution necessity determining means for determining authentication execution necessity by determining whether there is authentication timing;

the management device includes,
an authentication means for carrying out authentication based on the authentication related information, and
a biological information storage processing means for storing the biological information acquired through the communication means regardless of whether the authentication result of the authentication means is acceptable or failed; wherein the authentication related information transmission means is configured to transmit legitimate authentication information with the communication means if determined that authentication execution is necessary by the authentication execution necessity determining means, and transmit dummy information with the communication means if determined that authentication execution is not necessary.

2. The biological information management device according to claim 1, wherein
the management device includes,
an authentication execution necessity determining means for determining authentication execution necessity at the same standard as the authentication execution necessity determining means, and
the authentication means is configured to execute authentication if determined that authentication execution is necessary by the authentication execution necessity determining means, and not execute authentication if determined that authentication execution is not necessary.

3. The biological information management system according to claim 2, wherein the biological information storage processing means is configured to store at least one determination result information of authentication success determination or authentication fail determination by the authentication means, and authentication execution unnecessary determination by the authentication execution necessity determining means in the storage means in association with the biological information.

4. A biological information management system comprising a biological information measuring device including a biological information measurement means for measuring biological information and a communication means for transmitting the biological information, and a management device including a communication means for communicating with the biological information measuring device and a storage means for storing the biological information acquired through the communication means; wherein
the biological information measuring device includes
an authentication related information transmission means for transmitting authentication related information related to authentication of the biological information measuring device when transmitting the biological information with the communication means; and
the management device includes,
an authentication means for carrying out authentication based on the authentication related information,
a biological information storage processing means for storing the biological information acquired through the communication means regardless of whether the authentication result of the authentication means is acceptable or failed; and
an excluding means for excluding reception of biological information transmitted from the biological information measuring device based on excluding condition and determining whether there is authentication timing; and
the excluding condition is configured to exclude the reception if both a first condition based on authentication information authenticated by the authentication means and a second condition defined at a standard different from the first condition.

5. A biological information management method for managing biological information measured with a biological information measuring device in a management device; the biological information management method comprising the steps of:
having the biological information measuring device transmit authentication related information related to authentication of the biological information measuring device by the authentication related information transmission means at a predetermined timing when transmitting the biological information with a communication means;
having the biological information measuring device determine authentication execution necessity by an authentication execution necessity determining means by determining whether there is authentication timing;
having the management device receive both authentication related information related to authentication and the biological information from the biological information measuring device;
having the management device carry out authentication based on the authentication related information; and
storing the biological information acquired through the communication means in the storage means regardless of whether the authentication result of the authentication means is acceptable or failed; wherein
the step of transmitting the authentication related information by the authentication related information transmission means is configured to transmit legitimate authentication information with the communication means if determined that authentication execution is necessary by the authentication execution necessity determining means, and transmit dummy information with the communication means if determined that authentication execution is not necessary.

* * * * *